US009182493B2

(12) United States Patent
Waters et al.

(10) Patent No.: US 9,182,493 B2
(45) Date of Patent: Nov. 10, 2015

(54) FINE TIME ASSISTANCE FOR GLOBAL NAVIGATION SATELLITE SYSTEMS

(75) Inventors: Deric Wayne Waters, Dallas, TX (US); Ariton E. Xhafa, Plano, TX (US); Ramanuja Vedantham, Allen, TX (US)

(73) Assignee: TEXAS INSTRUMENTS INCORPORAED, Dallas, TX (US)

( * ) Notice: Subject to any disclaimer, the term of this patent is extended or adjusted under 35 U.S.C. 154(b) by 917 days.

(21) Appl. No.: 13/415,609

(22) Filed: Mar. 8, 2012

(65) Prior Publication Data

US 2012/0229334 A1  Sep. 13, 2012

Related U.S. Application Data

(60) Provisional application No. 61/451,696, filed on Mar. 11, 2011.

(51) Int. Cl.
| G01S 19/25 | (2010.01) |
| G01S 19/05 | (2010.01) |
| H04W 56/00 | (2009.01) |

(52) U.S. Cl.
CPC .............. G01S 19/05 (2013.01); G01S 19/256 (2013.01); H04W 56/0045 (2013.01)

(58) Field of Classification Search
CPC .......... G01S 19/25; G01S 19/24; G01S 19/12
USPC ............................ 342/357.64, 357.63, 357.49
See application file for complete search history.

(56) References Cited

U.S. PATENT DOCUMENTS

| 2002/0107028 | A1* | 8/2002 | Rantalainen et al. ......... 455/456 |
| 2009/0258658 | A1 | 10/2009 | Edge et al. |
| 2009/0322601 | A1 | 12/2009 | Ladd et al. |
| 2010/0073229 | A1 | 3/2010 | Pattabiraman et al. |
| 2010/0109943 | A1* | 5/2010 | Park et al. .................. 342/357.1 |
| 2011/0018761 | A1* | 1/2011 | Walley et al. ............ 342/357.28 |
| 2011/0199262 | A1* | 8/2011 | Karaoguz et al. ........ 342/357.64 |
| 2012/0082188 | A2* | 4/2012 | Nicholls et al. ............... 375/145 |

OTHER PUBLICATIONS

Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 8: IEEE 802.11 Wireless Network Management, IEEE P802.11v/D16.0, Nov. 2010, 428 pages.

(Continued)

*Primary Examiner* — Harry Liu
(74) *Attorney, Agent, or Firm* — Steven A. Shaw; Charles A. Brill; Frank D. Cimino (57) ABSTRACT

Apparatus and method for providing fine timing assistance to global navigation satellite systems (GNSS) via wireless local area network (WLAN). In one embodiment, a method for synchronizing a global navigation satellite system (GNSS) receiver includes receiving, by a wireless device, via a wireless local area network (WLAN), fine time assistance information transmitted by an assisting device connected to the WLAN. A time value of a GNSS clock of the wireless device is adjusted based on the fine time assistance information. Based on the adjusted time value, GNSS codes of a GNSS positioning signal are acquired by the wireless device.

19 Claims, 5 Drawing Sheets

(56) References Cited

OTHER PUBLICATIONS

Standard for Information Technology—Telecommunications and Information Exchange Between Systems—Local and Metropolitan area networks—Specific requirements, Part 11: Wireless LAN Medium Access Control (MAC) and Physical Layer (PHY) specifications, Amendment 1: IEEE 802.11 Radio Resource Measurement of Wireless LANs, IEEE Std 802.11k, May 9, 2008, pp. 244.

Standard for Information Technology—Telecommunications and Information Exchange Between Systems—Local and Metropolitan area networks—Specific requirements, Part 11: Wireless LAN Medium Access Control (MAC) and Physical Layer (PHY) specifications, IEEE Std. 802.11, Jun. 12, 2007, pp. 1232.

Waters, Deric et al., "Fine-Time Assistance for GNSS Using Wi-Fi" International Conference on Indoor Positioning Navigation, Guimaraes, Portugal, Sep. 21-23, 2011, pp. 4.

* cited by examiner

FINE TIME ASSISTANCE FOR GLOBAL NAVIGATION SATELLITE SYSTEMS

CROSS-REFERENCE TO RELATED APPLICATION

The present application claims priority to U.S. Provisional Patent Application No. 61/451,696, filed on Mar. 11, 2011; which is hereby incorporated herein by reference in its entirety.

BACKGROUND

As mobile devices proliferate, the demand for services tailored to device location also increases. Location based services depend on positioning systems to determine device location. Global navigation satellite systems (GNSS), which include the global positioning system (GPS), GLONASS, Beidou, QZSS, SBAS, Galileo, and similar systems, are sometimes used in locations where it is difficult to acquire satellite signals. As satellite signal attenuation increases, the receiver must integrate the received signal over a longer period of time in order to acquire the signal. Without assistance some devices can take an excessively long time to compute a location or may fail to acquire satellite signals at all.

SUMMARY

Apparatus and method for providing fine timing assistance to global navigation satellite systems (GNSS) via wireless local area network (WLAN) are disclosed herein. In one embodiment, a method for synchronizing a global navigation satellite system (GNSS) receiver includes receiving, by a wireless device, via a wireless local area network (WLAN), fine time assistance information transmitted by an assisting device connected to the WLAN. A time value of a GNSS clock of the wireless device is adjusted based on the fine time assistance information. Based on the adjusted time value, GNSS codes of a GNSS positioning signal are acquired by the wireless device.

In another embodiment, a wireless device includes a GNSS receiver, a WLAN transceiver, and a synchronization system. The GNSS receiver includes a GNSS clock, and the WLAN receiver includes a WLAN clock. The synchronization system is configured to synchronize the WLAN clock to the GNSS clock. The synchronization system is also configured to adjust the GNSS clock based on fine timing assistance information received via the WLAN transceiver.

In yet another embodiment, a wireless system includes a first wireless device and a second wireless device. The first wireless device includes a GNSS receiver, a WLAN transceiver; and a clock synchronization system. The clock synchronization system is coupled to the GNSS receiver and the WLAN transceiver. The clock synchronization system is configured to synchronize a GNSS clock of the GNSS receiver to GNSS timing based on fine time assistance information provided via the WLAN transceiver. The second wireless device includes a WLAN transceiver configured to provide fine time assistance information based on a clock of the WLAN transceiver, and to transmit the fine time assistance information to the first wireless device.

In a further embodiment, a wireless device includes a WLAN transceiver and a synchronization system. The WLAN transceiver includes a WLAN clock. The synchronization system is configured to synchronize the WLAN clock GNSS timing. The synchronization system is also configured to transmit fine timing assistance information, based on the WLAN clock, to a different wireless device via the WLAN. The fine timing assistance information provides timing that is within less than a GNSS pseudo-noise code period of GNSS timing.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Because satellite signal acquisition can require an undesirably long time, various assisted global navigation satellite systems (GNSS), such as assisted global positioning system (AGPS) have been developed. Assisted GNSS systems can reduce the time required to determine the position of the satellite receiver. For example, the global positioning system (GPS) signal includes pseudo-noise sequences of one millisecond (ms) duration that are continuously repeated. In attempting to acquire a satellite signal, the GPS receiver must search over all possible code delays with a 1 ms window to find the proper sub-ms delay. Receiving time assistance that is more accurate than 1 ms enables the receiver to reduce the number of hypothetical code delays that must be searched. Consequently, time assistance more accurate than 1 ms is termed fine-time assistance.

Embodiments of the present disclosure provide fine timing assistance information via wireless local area network (WLAN), also known as WIFI, for use by a GNSS receiver. Thus, embodiments are applicable to reducing satellite signal acquisition time in an increasingly large number of wireless devices that incorporate both GNSS receivers and WLAN transceivers.

Figure 1:
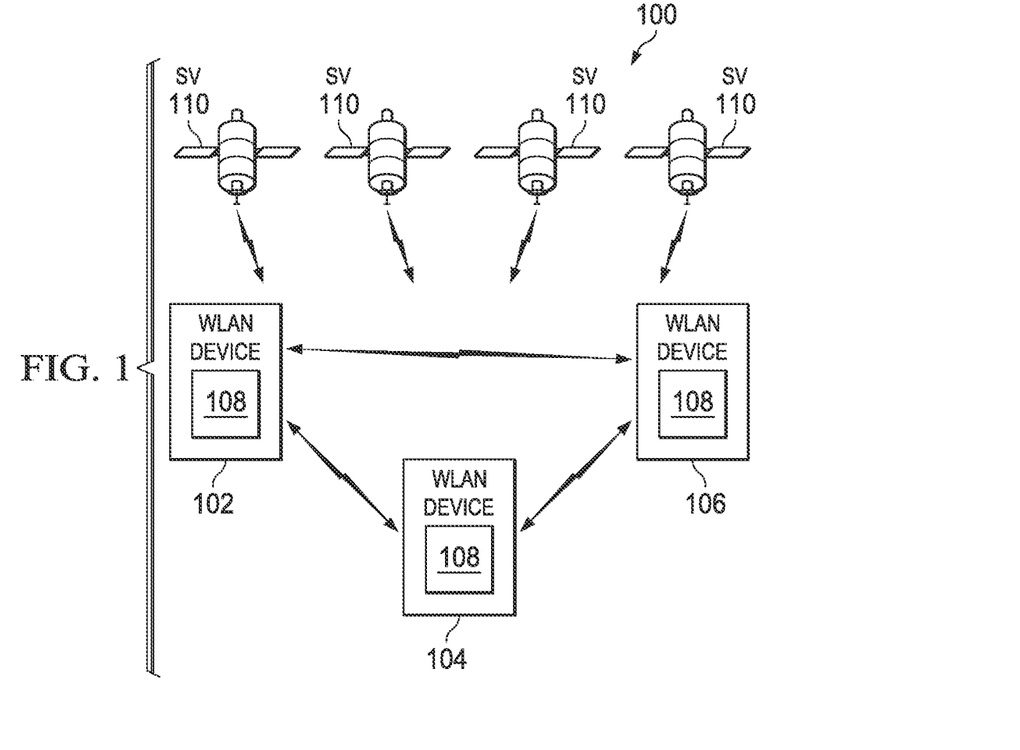
FIG. 1 shows a block diagram of a system for providing fine time assistance to a global navigation satellite system (GNSS) receiver via wired local area network (WLAN) in accordance with various embodiments.

FIG. 1 shows a block diagram of a system 100 for providing fine time assistance to a GNSS receiver via WLAN in accordance with various embodiments. The system 100 includes one or more positioning satellites 110 and at least two wireless devices 102, 104, 106. The positioning satellites 110 provide positioning signals for use by the wireless devices 102-106 for position determination. At least two of the wireless devices 102-106 are configured to perform positioning based on the signals transmitted by the positioning satellites 110. The wireless devices 102-106 are also configured to communicate via a WLAN (e.g., a WLAN in accordance with an IEEE 802.11 specification). The wireless devices 102-106 may be cellular telephones, tablet computers, or any other mobile computing devices configured for WLAN access and satellite positioning. While four positioning satellites 110 and three wireless devices 102-106 are shown in FIG. 1, in practice the system 100 may include any number of positioning satellites and wireless devices.

Each wireless device 102-106 may include a synchronization system 108 that adjusts the timing of a clock associated with the GNSS receiver of the wireless device 102-106. The synchronization system 108 receives fine timing assistance information via the WLAN from a different one of the wireless devices 102-106 and uses the received fine timing information to synchronize the GNSS clock to GNSS timing (satellite signal timing). When synchronized using the received fine timing information, the GNSS clock of the wireless device 102-106 has timing offset of less than 1 ms from GNSS timing. Consequently, a wireless device 102-106 receiving fine timing assistance information via WLAN searches fewer code delay and acquires the satellite positioning signal more quickly than without fine timing assistance.

The wireless devices 102-106 may be wireless stations or access points. Access points may be infrastructure access points (i.e., devices assigned to a fixed location and/or connected to a wired network) or soft access points (wireless devices that can operate as stations or access points). For example, the wireless device 104 may be an access point, and the wireless device 102 may be station. The access point 104 may provide fine timing assistance information to the wireless station 102 or receive fine timing information from the wireless station 102. In another example, the wireless devices 102, 106 are stations, and the wireless device 104 is an access point. The access point 104 facilitates a communication link (e.g., a tunneled direct link) between the wireless stations 102, 106, and one of the wireless stations provides fine timing assistance information to the other.

In embodiments of the system 100 where two of the wireless devices 102, 104 are access points and one of the wireless devices 102, 104 is to receive fine timing assistance from the other device, one of the devices may temporarily operate as a station. Alternatively, an access point may include a GNSS WLAN system dedicated to obtaining timing assistance and/or other location related activities.

In the present disclosure, a wireless device 102 that provides fine timing assistance to a different wireless device 104 is termed an "assisting device." Similarly, a wireless device 102 that receives fine timing assistance from a different wireless device 104 is termed an "assisted device."

Figure 2:
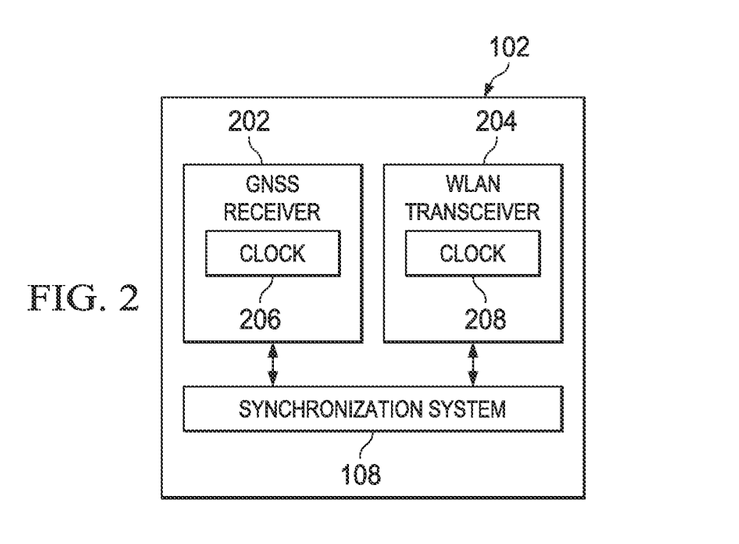
FIG. 2 shows a block diagram of a wireless device configured to synchronize a GNSS receiver using fine time assistance information provided via WLAN in accordance with various embodiments.

FIG. 2 shows a block diagram of a wireless device 102 configured to synchronize a GNSS receiver using fine time assistance information provided via WLAN in accordance with various embodiments. The wireless device 102 is shown, and wireless devices 104, 106 may include equivalent components and functionality. The wireless device 102 includes a GNSS receiver 202, a WLAN transceiver 204, and a synchronization system 108. The GNSS receiver 202 may be GPS receiver or any other receiver configured to receive satellite positioning signals transmitted by a positioning satellite 110, and to derive a position and/or timing reference from the received satellite signals. The GNSS receiver 202 includes a GNSS clock 206. The clock 206 is locked to (the timing of the clock 206 is substantially equal to) GNSS timing when the GNSS receiver 202 has acquired a satellite positioning signal.

The WLAN transceiver 204 provides circuitry through which the wireless device 102 accesses the wireless medium to communicate with one or more of the other wireless devices 104, 106 connected to the WLAN. The WLAN transceiver 204 includes a WLAN clock 208.

The synchronization system 108 maintains a known relationship between (i.e., locks) the GNSS clock 206 and the WLAN clock 208. In some embodiments of the synchronization system 108, a clock provided by the synchronization system 108 drives the GNSS clock 206 and the WLAN clock 208, thereby maintaining a fixed clock bias between the clocks 206, 208. The synchronization system 108 receives fine timing assistance information through the WLAN transceiver 204 (as transmitted over the WLAN from a wireless device 104, 106) and adjusts the timing of the GNSS clock 206 based on the fine timing assistance information to reduce time difference between the GNSS clock 206 and GNSS timing.

The synchronization system 108 is also configured to provide fine timing information to the WLAN transceiver 204 for transmission to a different wireless device 104, 106. For example, the synchronization system 108, may load a time value into a packet for transmission via the WLAN transceiver 204. The time value may be a time value derived from one of the WLAN clock 208 and the GNSS clock 206. For example, the time value may be a time of departure value provided by one of the WLAN clock 208 and the GNSS clock 206 that can be used to synchronize the GNSS clock 206 of a wireless device 104, 106 that receives the packet containing the time value.

Various components of the mobile wireless device 102 including at least some portions of the synchronization system 108 can be implemented using a processor executing software programming that causes the processor to perform the operations described herein. In some embodiments, a processor executing software instructions causes the wireless device 102 to extract fine time assistance information from a packet received via a WLAN and adjust a GNSS clock 206 based on the extracted information. Further, a processor executing software instructions can provide fine timing information to a wireless device via WLAN.

Suitable processors include, for example, general-purpose microprocessors, digital signal processors, microcontrollers, and other instruction execution devices. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming (i.e., processor executable instructions) that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, read-only-memory), or combinations thereof. Processors execute software instructions. Software instructions alone are incapable of performing a function. Therefore, in the present disclosure, any reference to a function performed by software instructions, or to software instructions performing a function is simply a shorthand means for stating that the function is performed by a processor executing the instructions.

In some embodiments, portions of the mobile wireless device 102, including portions of the synchronization system 108 may be implemented using dedicated circuitry (e.g., dedicated circuitry implemented in an integrated circuit). Some embodiments may use a combination of dedicated circuitry and a processor executing suitable software. For example, some portions of the synchronization system 108 may be implemented using a processor or hardware circuitry. Selection of a hardware or processor/software implementation of embodiments is a design choice based on a variety of factors, such as cost, time to implement, and the ability to incorporate changed or additional functionality in the future.

Embodiments of the wireless devices 102-106 may exchange fine timing assistance information in a variety of ways. Some embodiments provide fine time assistance via time advertisements. An access point can transmit a time advertisement as part of a beacon frame or a probe response. Stations can transmit a time advertisement as part of a vendor specific field of a probe request frame. Alternatively, fine timing assistance information may be provided via a time measurement action frame by either an access point or a station. An example of a time advertisement structure and a time measurement action frame that may be employed by some embodiments of the wireless device 102 is described in the IEEE 802.11v specification.

A time advertisement may describe a source of time corresponding to a time standard, and external clock, an estimate of the offset between the time standard and the timer of the assisting device, and an estimate of the standard deviation of the error in the offset estimate. An assisted device can process a time advertisement element received from an assisting device in a beacon frame, probe response frame, or probe request frame, and derive therefrom:
1. the time of transmission according to a reference time such as coordinated universal time (UTC), and
2. the standard deviation of the error in the time of transmission.

If a wireless device 102 receives a transmitted time advertisement from the wireless device 104, then the wireless device 102 is within about 200 meters of the wireless device 104 that transmitted the time advertisement due to the limited range of WLAN signals. If the wireless device 104 is synchronized to GNSS timing, then the wireless device 102 can correct its clock by changing the time of the GNSS clock 206 to match the time of transmission plus an estimated propagation delay (if available). Thus, the GNSS clock 206 at the wireless device 102 is provided with fine-timing assistance. That can have precision within a few microseconds depending on the accuracy of the clock 206 of the wireless station 104.

Figure 3:
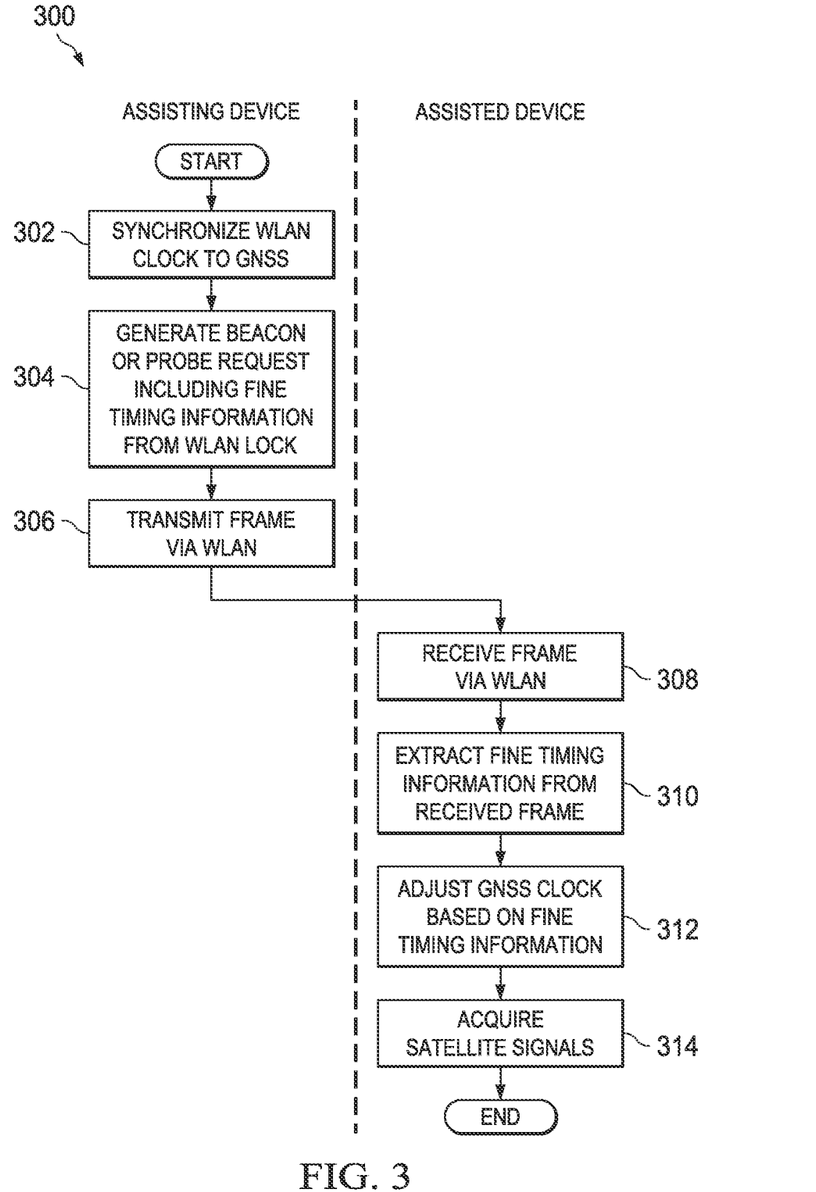
FIGS. 3-6 show flow diagrams for methods for providing fine time assistance to a GNSS receiver via WLAN in accordance with various embodiments.

FIG. 3 shows a flow diagram for a method 300 for providing fine time assistance to a GNSS receiver via WLAN in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 300, as well as other operations described herein, can be performed by a processor executing instructions stored in a computer readable medium.

In the method 300, the assisting device 104 and the assisted device 102 may be either an access point or a wireless station. In block 302, the assisting device 104 synchronizes its WLAN clock 208 to GNSS timing. In some embodiments, the assisting device is receiving positioning signals from a positioning satellite 110 and synchronizes the GNSS clock 206 and the WLAN clock 208 to GNSS timing as provided via the satellite positioning signals. In other embodiments, the assisting device 104 receives fine timing assistance information from a different wireless device and synchronizes its WLAN clock 208 based on the fine timing assistance. In such embodiments, the assisting device 104 may lack a GNSS receiver 202.

If the assisting device 104 estimates position using a non-GNSS technology such as WLAN positioning, then the assisting device 104 can use the positioning satellites 110 to solve only for clock bias. Any error in the position estimate will cause error in the clock bias estimate. WLAN positioning typically has accuracies less than 300 m which leads to less than 1 microsecond in additional error. Thus, synchronization with GNSS can be achieved with only one satellite signal based on known latitude, longitude, and altitude. An additional satellite signal is required for each unknown position dimension.

In block 304, the assisting device 104 generates a beacon frame or a probe request frame, and inserts fine timing assistance information, such as time of departure provided from the WLAN clock, into the generated frame. The fine timing assistance information may be inserted into a time advertisement that is included in the frame. The assisting device 104 transmits the generated frame over the WLAN in block 306.

In block 308, the assisted device 102 receives the transmitted frame and records the time of arrival (TOA). The assisted device 102 extracts the fine timing assistance information from the frame in block 310. For example, the assisted device 102 may extract a time of departure (TOD) value and optionally extract the uncertainty of the time of departure from the received frame. Some embodiments may also compute a propagation delay value (D). The assisted device 102 may compute the relative clock bias between the assisted device 102 and the assisting device 104 as:

$$\Delta b = \text{TOA} - (\text{TOD} + D).$$

In block 312, the assisted device 102 adjusts the GNSS clock 206 based on the fine timing information. For example, the assisted device 102 may synchronize the GPS clock 206 using the computed relative clock offset and its uncertainty (which is a function of the uncertainties of TOA, TOD, & D).

In block 314, the assisted device 102 acquires satellite signals using the synchronized GNSS clock 206.

Figure 4:
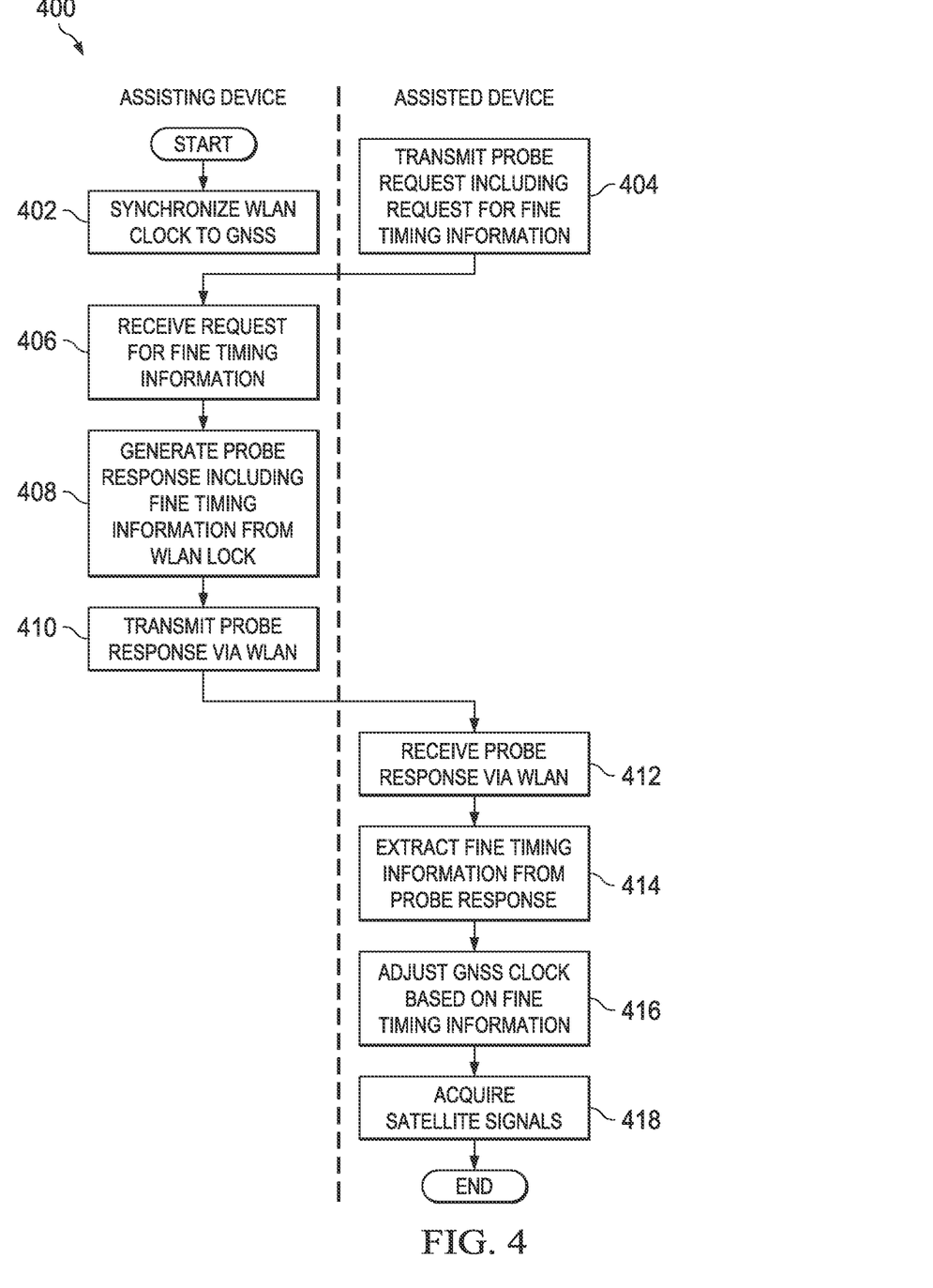

FIG. 4 shows a flow diagram for a method 400 for providing fine time assistance to a GNSS receiver via WLAN in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400, as well as other operations described herein, can be performed by a processor executing instructions stored in a computer readable medium.

In the method 400, the assisting device 104 is an access point and the assisted device 102 is a wireless station. In block 402, the assisting device 104 synchronizes its WLAN clock 208 to GNSS timing as explained with regard to block 302 of method 300.

In block 404, the assisted device 102 generates and transmits, via the WLAN, a probe request frame that includes a request for fine timing assistance information. The assisting device 104 receives the request for fine timing information via the WLAN in block 406.

In block 408, the assisting device 104 generates a probe response frame, and inserts fine timing assistance information, such as time of departure provided from the WLAN clock, into the generated frame. The fine timing assistance information may be inserted into a time advertisement that is included in the frame. The assisting device 104 transmits the generated frame over the WLAN in block 410.

In block 412, the assisted device 102 receives the transmitted frame. The assisted device 102 extracts the fine timing assistance information and computes clock bias, in block 414, as explained above with regard to block 308 of method 300.

In block 416, the assisted device 102 adjusts the GNSS clock 206 based on the fine timing information as described in block 310 of method 300. The assisted device 102 acquires satellite signals using the synchronized GNSS clock 206 in block 418.

Figure 5:
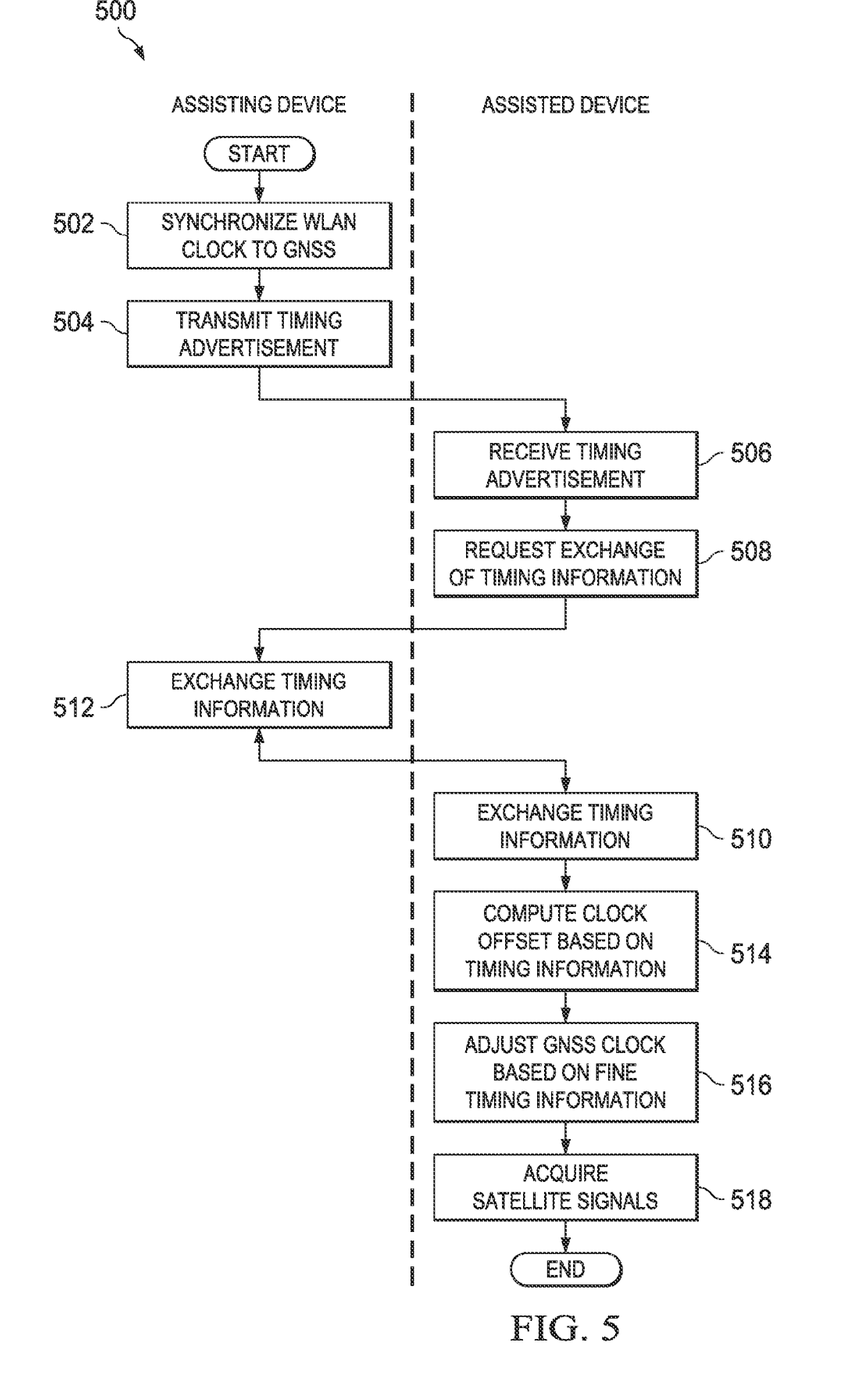

FIG. 5 shows a flow diagram for a method 500 for providing fine time assistance to a GNSS receiver via WLAN in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500, as well as other operations described herein, can be performed by a processor executing instructions stored in a computer readable medium.

In the method 500, the assisting device 104 is an access point and the assisted device 102 is a wireless station. In block 502, the assisting device 104 synchronizes its WLAN clock 208 to GNSS timing as explained with regard to block 302 of method 300.

In block 504, the assisting device 104 generates and transmits, via the WLAN, a time advertisement including information indicating that the assisting device 104 is synchronized to GNSS timing and available to provide fine timing assistance.

In block 506, the assisted device 102 receives, via the WLAN, the time advertisement transmitted by the assisting device 104. The assisted device 102 generates and transmits to the assisting device 104, via the WLAN, a request for exchange of timing information in block 508. The request for exchange of timing information may be a time measurement request frame. The timing measure measurement procedure enables the assisted device 102 to synchronize its clock to the assisting device 104. Thus, the exchange of timing information via the time measurement procedure may provide more precise synchronization than time advertisement because the propagation delay and clock offsets can both be computed. However, the assisting device 104 still must transmit a time advertisement element to allow the assisted device 102 to discover that the assisting device 104 is prepared to provide fine time assistance.

In blocks 510-512, the assisted device 102 and the assisting device 104 exchange timing information. A part of the exchange, the assisting device 104 may: send an acknowledgement to the request for exchange, send a first time measurement action frame and record its time of departure (T1), receive the acknowledgement to this frame and record its time of arrival (T4), send a second time measurement action frame and insert into the second frame the time of arrival and time of departure observed for the first frame.

As part of the exchange, the assisted device 102 may: measure the time of arrival of the first time measurement action frame (T2), measure the time of departure for the acknowledgement to the first time measurement action frame (T3), and receive the second time measurement action frame.

In block 514, the assisted device 102 extracts the fine timing assistance information from the received frame and computes clock offset as:

$$((T2-T1)-(T4-T3))/2.$$

The assisted device 102 adjusts the GNSS clock 206 based on the fine timing information (e.g., adjusts the GNSS clock 206 in accordance with the computed clock offset) in block 516.

In block 518, the assisted device 102 acquires satellite signals using the synchronized GNSS clock 206

Figure 6:
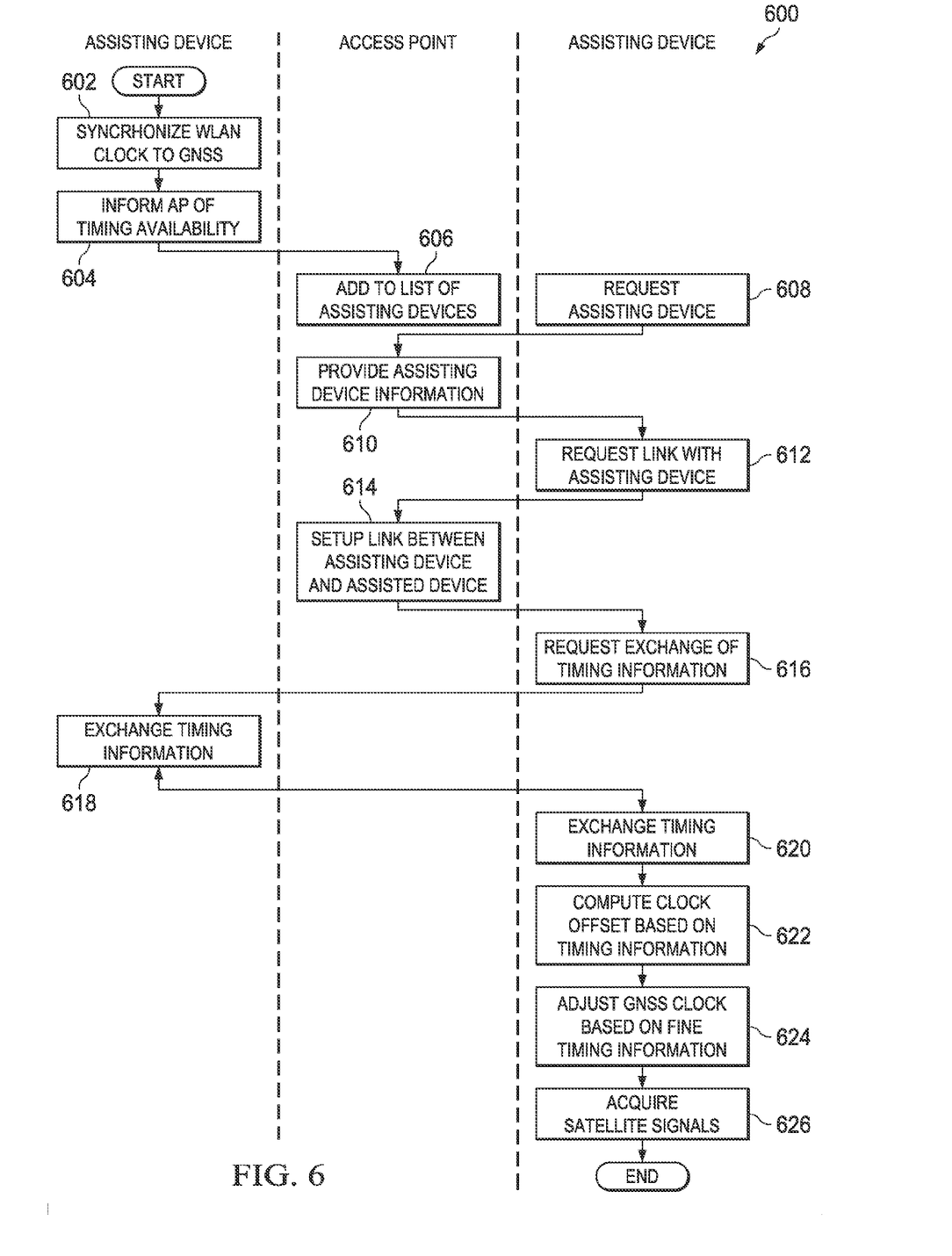

FIG. 6 shows a flow diagram for a method 600 for providing fine time assistance to a GNSS receiver via WLAN in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be performed by a processor executing instructions stored in a computer readable medium.

In the method 600, the assisting device 104 and the assisted device 102 are wireless stations. In block 602, the assisting device 104 synchronizes its WLAN clock 208 to GNSS timing as explained with regard to block 302 of method 300.

In block 604, the assisting device 104 generates and transmits, via the WLAN, a time advertisement including information indicating that the assisting device 104 is synchronized to GNSS timing and available to provide fine timing assistance. The wireless device 106 is an access point. The access point 106 receives the time advertisement, in block 606, and adds the assisting device 104 to a list of devices available to provide fine timing assistance information.

In block 608, the assisted device 102 searches for a device that is available to provide fine timing assistance information. The assisted device 102 generates and transmits, via the WLAN, a packet requesting information regarding an assisting device.

In block 610 the access point 106 receives the request for assisting device information. In response to the request, the access point 106 transmits, to the assisted device 102, information indicating the that assisting device 104 is available and capable of providing fine timing assistance In block 612, the assisted device 102 requests initiation of a link with the assisting device 104. The access point 106 sets up the link between the assisted device 102 and the assisting device 104 in block 614. The link may be a tunneled direct link in some embodiments.

In block 616, the assisted device 102 generates and transmits to the assisting device 104, via the WLAN, a request for exchange of timing information as described with regard to block 508 of method 500. The assisted device 102 and the assisting device 104 exchange timing information in blocks 618-620. The information exchange may be as described in blocks 510-512 of the method 500.

In block 622, the assisted device 102 extracts the fine timing assistance information from the timing frame transmitted by the assisting device 104 and computes clock offset as described with regard to block 514 of method 500. The assisted device 102 adjusts the GNSS clock 206 based on the fine timing information (e.g., adjusts the GNSS clock 206 in accordance with the computed clock offset) in block 624.

In block 626, the assisted device 102 acquires satellite signals using the synchronized GNSS clock 206

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for synchronizing a global navigation satellite system (GNSS) receiver, comprising:
   receiving, by a wireless device, via a wireless local area network (WLAN), fine time assistance information transmitted by an assisting device connected to the WLAN;
   adjusting, by the wireless device, a time value of a GNSS clock of the wireless device based on the fine time assistance information;
   acquiring, by the wireless device, GNSS codes of a GNSS positioning signal based on the adjusted time value
   extracting a departure time from the received fine time assistance information measuring an arrival time of the fine time assistance information at the wireless device;
   estimating a value for propagation delay time within the wireless device;
   computing clock bias between the wireless device and the assisting device based on the departure time, arrival time, and value for propagation delay; and
   adjusting the time value based on the clock bias.

2. The method of claim 1, further comprising:
   synchronizing, by the assisting device, a WLAN clock of the assisting device to GNSS timing; and
   reading a time value from the WLAN clock; and
   transmitting the time value as part of the fine time assistance information to the wireless device.

3. The method of claim 1, wherein the adjusting synchronizes the GNSS clock to within less than 1 millisecond of GNSS timing.

4. The method of claim 1, wherein the assistance time information is embedded in one of a beacon frame, a probe request frame, and a probe response frame.

5. The method of claim 1, wherein the fine timing assistance information comprises departure time of a first packet transmitted by the assisting device and reception time of a second packet received by the assisting device in response to the first packet; the method further comprising:
   computing, by the wireless device, clock bias between the wireless device and the assisting device based on the fine timing information, reception time of the first packet, and transmission time of the second packet; and
   adjusting the time value based on the clock bias.

6. The method of claim 1 further comprising establishing a communication link between the wireless device and the assisting device via an access point on the WLAN; the establishing comprising:
   notifying, by the wireless device, the access point of a desire to adjust the GNSS clock of the wireless device;
   receiving from the access point notification that the assisting device is available to provide fine timing information;
   initiating, by the wireless device, a link with the assisting device through the access point;
   requesting, by the wireless device, fine timing information from the assisting device.

7. A wireless device, comprising:
   a global navigation satellite system (GNSS) receiver comprising a GNSS clock;
   a wireless local area network (WLAN) transceiver comprising a WLAN clock; and
   a synchronization system configured to:
      synchronize the WLAN clock to the GNSS clock;
      adjust the GNSS clock based on fine timing assistance information received via the WLAN transceiver
      extract a departure time from the fine time assistance information
      measure an arrival time of the fine time assistance information at the wireless device;
      estimate a value for propagation delay time within the wireless device;
      compute clock bias between the wireless device and an assisting device that transmitted the fine time assistance information based on the departure time, arrival time, and value for propagation delay; and
      adjust the GNSS clock based on the clock bias.

8. The wireless device of claim 7, wherein the synchronization system comprises a synchronization clock that locks the WLAN clock and the GNSS clock.

9. The wireless device of claim 7 wherein the synchronization system is configured to extract the fine timing information from one of a beacon frame, a probe request frame, and a probe response frame received by the wireless device via the WLAN.

10. The wireless device of claim 7, wherein the synchronization system is configured to:
   read a time value from the WLAN clock; and
   transmit the time value as fine time assistance information to an assisted device via the WLAN.

11. The wireless device of claim 7, wherein adjustment of the GNSS clock based on fine timing information synchronizes the GNSS clock to within less than one millisecond of GNSS timing.

12. The wireless device of claim 7, wherein the fine timing assistance information comprises departure time of a first packet transmitted by an assisting device and reception time of a second packet received by the assisting device in response to the first packet; wherein the synchronization system is configured to:
   compute clock bias between the wireless device and an assisting device based on the fine timing information, reception time of the first packet, and transmission time of the second packet; and
   adjust the GNSS clock based on the clock bias.

13. The wireless device of claim 7, wherein the synchronization system is configured to:
   notify an access point of a request to adjust the GNSS clock of the wireless device;
   receive from the access point notification that an assisting device is available to provide fine timing information;

initiate a link with the assisting device through the access point;
request fine timing information from the assisting device.

14. A wireless system, comprising:
a first wireless device, comprising:
  a global navigation satellite system (GNSS) receiver;
  a wireless local area network (WLAN) transceiver; and
  a clock synchronization system coupled to the GNSS receiver and the WLAN transceiver, the clock synchronization system configured to:
    synchronize a GNSS clock of the GNSS receiver to GNSS timing based on fine time assistance information provided via the WLAN transceiver;
    extract a departure time from the received fine time assistance information
    measure an arrival time of the fine time assistance information at the first wireless device;
    estimate a value for propagation delay time within the first wireless device;
    compute clock bias between the first wireless device and the second wireless device based on the departure time, arrival time, and value for propagation delay; and
    adjust the GNSS clock based on the clock bias;
a second wireless device, comprising:
  a wireless local area network (WLAN) transceiver configured to:
    provide fine time assistance information based on a clock of the WLAN transceiver of the second wireless device; and
    transmit the fine time assistance information to the first wireless device.

15. The system of claim 14, wherein the second wireless device comprises a clock synchronization system coupled to the WLAN transceiver of the second wireless device, the clock synchronization system configured to:
  synchronize a WLAN clock of the WLAN receiver of the second wireless device to GNSS timing based on fine time assistance information provided by the WLAN transceiver of the second wireless device; and
  generate the fine time assistance information transmitted to the first wireless device from the WLAN clock of the second wireless device.

16. The system of claim 14, wherein the fine time assistance information provided by the WLAN transceiver synchronizes the GNSS clock to within less than 1 millisecond of GNSS timing.

17. The system of claim 14, wherein the WLAN transceiver of the second wireless device is configured to transmit the fine time assistance information in one of a beacon frame, a probe request frame, and a probe response frame.

18. The system of claim 14, wherein the fine timing assistance information comprises departure time of a first packet transmitted by the second wireless device and reception time of a second packet received by the second wireless device in response to the first packet; wherein the clock synchronization system is configured to:
  compute clock bias between the second wireless device and the first wireless device based on the fine timing information, reception time of the first packet, and transmission time of the second packet; and
  adjust the GNSS clock based on the clock bias.

19. The system of claim 14, further comprising a third wireless device comprising a WLAN transceiver; wherein the clock synchronization system is configured to:
  notify the third wireless device of a request to adjust the GNSS clock of the first wireless device;
  receive from the third wireless device notification that the second wireless device is available to provide fine timing information;
  initiate a link with the second wireless device through the third wireless device;
  request fine timing information from the second wireless device.

* * * * *